(12) United States Patent
Wang et al.

(10) Patent No.: US 9,690,049 B2
(45) Date of Patent: Jun. 27, 2017

(54) OPTICAL LINE PROTECTION WITH DIGITAL DISPERSION COMPENSATION MODULE

(71) Applicants: Tongqing Wang, Newark, CA (US); Dobby Lam, Dublin, CA (US); Jinghui Li, Sierra Madre, CA (US)

(72) Inventors: Tongqing Wang, Newark, CA (US); Dobby Lam, Dublin, CA (US); Jinghui Li, Sierra Madre, CA (US)

(*) Notice: Subject to any disclaimer, the term of this patent is extended or adjusted under 35 U.S.C. 154(b) by 347 days.

(21) Appl. No.: 14/120,698

(22) Filed: Jun. 17, 2014

(65) Prior Publication Data

US 2015/0365317 A1 Dec. 17, 2015

(51) Int. Cl.
| | | |
|---|---|---|
| *H04B 10/00* | (2013.01) | |
| *H04J 14/02* | (2006.01) | |
| *G02B 6/293* | (2006.01) | |
| *G02B 6/26* | (2006.01) | |
| *G02B 6/35* | (2006.01) | |
| *G02B 6/02* | (2006.01) | |
| *H04B 10/079* | (2013.01) | |
| *H04B 10/2519* | (2013.01) | |
| *H04L 12/707* | (2013.01) | |
| *H04Q 11/00* | (2006.01) | |
| *H04B 10/2513* | (2013.01) | |

(52) U.S. Cl.
CPC ..... *G02B 6/29392* (2013.01); *G02B 6/02076* (2013.01); *G02B 6/268* (2013.01); *G02B 6/29317* (2013.01); *G02B 6/356* (2013.01); *H04B 10/07951* (2013.01); *H04B 10/2519* (2013.01); *H04B 10/25133* (2013.01); *H04L 45/22* (2013.01); *H04Q 11/0005* (2013.01); *H04Q 11/0066* (2013.01); *H04Q 2011/0022* (2013.01); *H04Q 2011/0081* (2013.01); *H04Q 2011/0083* (2013.01)

(58) Field of Classification Search
CPC ............ H04B 10/07951; H04B 10/25133
USPC .......................................... 398/16
See application file for complete search history.

(56) References Cited

U.S. PATENT DOCUMENTS

| | | | | |
|---|---|---|---|---|
| 5,602,666 A | * | 2/1997 | Ishikawa ............ | G02B 6/29377 398/147 |
| 5,930,414 A | * | 7/1999 | Fishman ............ | H04B 10/2569 385/11 |
| 6,778,782 B1 | * | 8/2004 | Watley ............... | H04B 10/2519 385/11 |

(Continued)

*Primary Examiner* — Ken N Vanderpuye
*Assistant Examiner* — Amritbir Sandhu (57) ABSTRACT

Embodiments of present invention provide an optical signal transportation system. The system includes a first and a second optical line protection (OLP) node; a working signal transmission medium and a protection signal transmission medium between the first and second OLP nodes providing transportation paths for an optical signal from the first OLP node to the second OLP node; and at least one digital dispersion compensation module (DDCM) connected to at least one of the working and protection signal transmission media inside the second OLP node, wherein the DDCM includes a plurality of dispersion compensation units (DCUs) with each DCU being capable of providing either a positive or a negative dispersion selected by an optical switch to the optical signal, and wherein the DDCM is capable of providing the optical signal a total dispersion determined by the optical switch of each of the plurality of DCUs.

15 Claims, 8 Drawing Sheets

(56) References Cited

U.S. PATENT DOCUMENTS

| | | | |
|---|---|---|---|
| 6,865,311 B2 | 3/2005 | Li | |
| 8,543,000 B2* | 9/2013 | Vassilieva | H04B 10/2572 398/147 |
| 2001/0024306 A1* | 9/2001 | Okuno | H04B 10/25133 398/147 |
| 2003/0128920 A1* | 7/2003 | Way | H04B 10/2525 385/27 |
| 2003/0198473 A1* | 10/2003 | Sekiya | H04B 10/25253 398/81 |
| 2003/0210876 A1* | 11/2003 | Gaarde | G02B 6/02242 385/123 |
| 2004/0005153 A1* | 1/2004 | Watanabe | G02F 1/353 398/148 |
| 2004/0213500 A1* | 10/2004 | Zeng | G02B 6/105 385/11 |
| 2007/0292079 A1* | 12/2007 | Jones | G02B 6/29352 385/27 |
| 2008/0199182 A1* | 8/2008 | Ooi | H04B 10/2513 398/81 |
| 2009/0202248 A1* | 8/2009 | Zhang | H04B 10/07951 398/81 |
| 2010/0054743 A1* | 3/2010 | Heaton | H03M 1/121 398/91 |
| 2011/0052198 A1* | 3/2011 | Ohtani | H04B 10/25133 398/81 |
| 2011/0205531 A1* | 8/2011 | Ohtani | G01M 11/335 356/73.1 |
| 2012/0148259 A1* | 6/2012 | Anderson | H04B 10/25133 398/148 |
| 2015/0043917 A1* | 2/2015 | Simonneau | H04B 10/07 398/79 |
| 2015/0109622 A1* | 4/2015 | Ota | G01N 21/4795 356/479 |
| 2016/0274304 A1* | 9/2016 | Bickham | G02B 6/4246 |
| 2016/0277816 A1* | 9/2016 | Yuang | H04Q 11/0005 |

* cited by examiner

OPTICAL LINE PROTECTION WITH DIGITAL DISPERSION COMPENSATION MODULE

CROSS REFERENCE TO RELATED APPLICATION

The present application is a continuation-in-part (CIP) application of a concurrently filed U.S. patent application entitled "Digital Dispersion Compensation Module", and claims benefit of priority to a provisional U.S. patent application Ser. No. 61/957,352 filed Jul. 1, 2013, the content of which are both incorporated by reference in their entirety.

FIELD OF THE INVENTION

The present invention relates generally to system and configuration thereof for optical data transportation and, in particular, relates to an optical line protection system with digital dispersion compensation module.

BACKGROUND

Optical signal transmission and transportation is a key enabling force in today's high speed digital communication infrastructure which supports vast amount of data transportation that are essential for many data centric informational applications such as, for example, internet application. With ever increasing demand for transportation bandwidth, new optical signal transmission and transportation systems are constantly being developed which trend toward higher data rate and higher channel density count.

Optical signal, in a format of binary or multi digital level, usually experiences certain amount of distortion during transportation that, together with other causes such as noise, affects overall system performance. Generally, the higher the data rate of and the longer a distance traveled by an optical signal, the bigger the amount of distortion that the optical signal usually experiences. Among many factors contributing to the optical signal distortion, chromatic dispersion of the transportation media such as fiber is a main factor. The amount of dispersion that an optical signal is able to tolerate in a transmission system varies inversely proportional to the square of the data-rate. As a general rule of thumb, for a 40 Gb/s direct detection system, the dispersion window is typically less than the equivalent of 10 km of SMF-28 fiber at 1550 nm wavelength.

Figure 1:
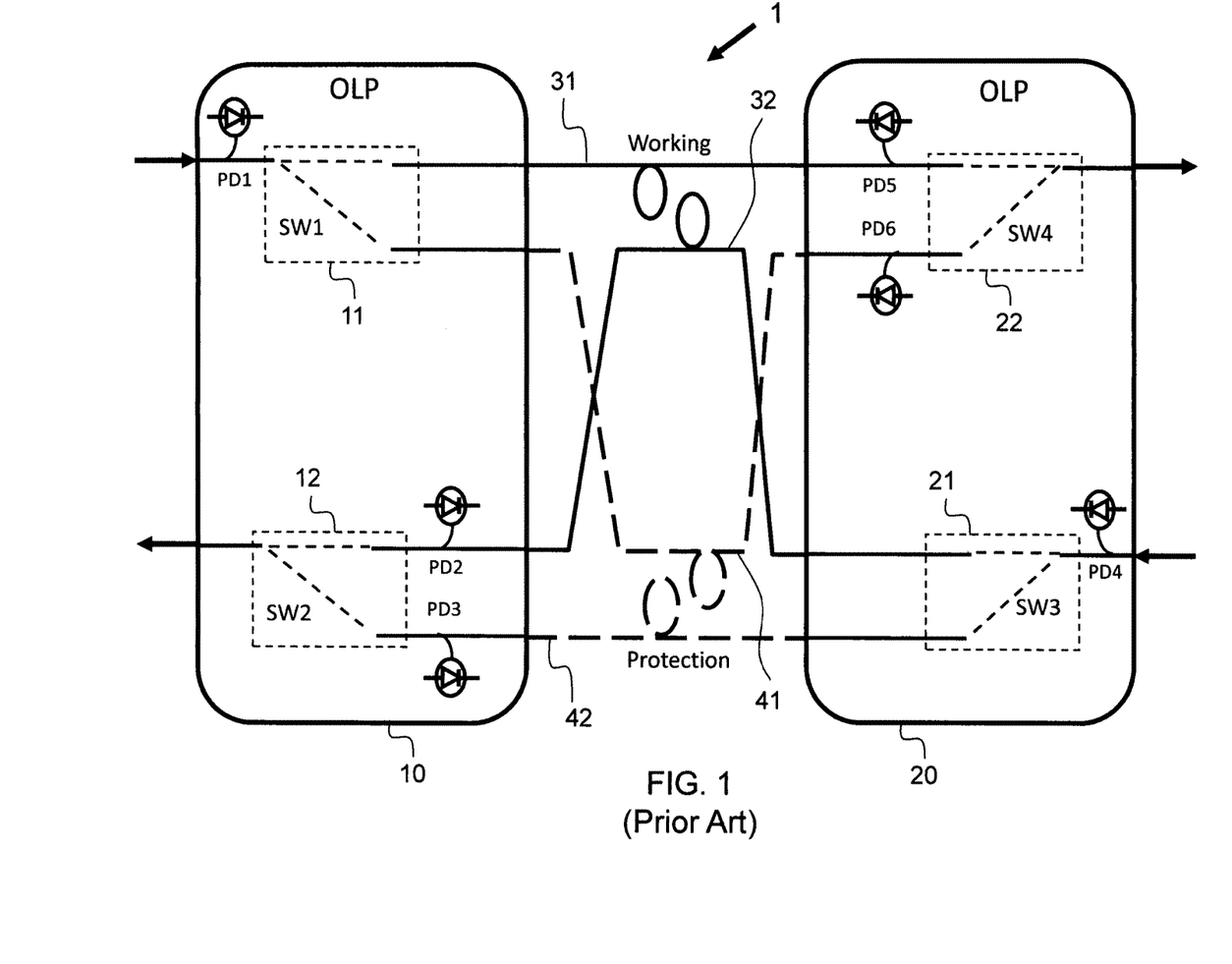
FIG. 1 is a simplified functional block diagram of optical line protection scheme as is known in the art.

FIG. 1 is a simplified functional block diagram of an optical signal transportation system with line protection scheme as is known in the art. Under normal working conditions, optical signals are usually transported over working fiber paths 31 and 32, as a bidirectional optical transportation system 1, between terminal 10 and terminal 20. If there is a fault such as fiber cut in one or both of the working fiber paths 31 and 32, the amount of optical signal received at photo-detector PD2 in terminal 10 and/or at photo-detector PD5 in terminal 20 will generally decrease to a level below a pre-defined threshold. As a result, this decrease in signal level triggers optical line protection (OLP) switches, such as SW1 and SW2 in terminal 10 and SW3 and SW4 in terminal 20, to switch and cause the system to transmit and receive optical signals via protection fiber paths 41 and 42 instead of working fiber paths 31 and 32. The same event, such as fiber cut, may also generate a system alarm to alert the happening and existence of such a fault in the working fiber paths 31 and 32. Optical signals transported over protection fiber paths 41 and 42 may continue to be monitored by photo-detectors PD3 and PD6. In the bidirectional transportation system 1 illustrated in FIG. 1, photo-detectors PD1 and PD4 are used to monitor optical signal levels launched into the fibers 31/41 and/or 32/42, in both directions.

However, the above optical system configuration may not work well on fiber links with a narrow dispersion window due to difference in total fiber dispersion between the working fiber paths 31/32 and the protection fiber paths 41/42. This is especially true in a DQPSK direct detection system where data rate of the optical signal is around 40 Gb/s or even higher such as 100 Gb/s. Generally, in the above system in order to expand dispersion window that an optical signal may be able to tolerate, fiber-bragg gratings (FBG) and/or more frequently Etalon-based channelized tunable dispersion compensation modules (TDCM) (both of which are not shown in FIG. 1) are used at the receiving end of each channels of their respective terminals.

In order to get optical transportation system 1 back to work or recovered once being interrupted due to, e.g., fiber cut, the tunable dispersion compensation module (TDCM) in each receiving channel is required to change or modify their dispersion setting so as to compensate any difference in the amount of total dispersion between the working (31/32) and the protection (41/42) fiber paths. However, dispersion of this channelized TDCM is normally tuned through gradual temperature change which is generally considered being slow, in the range of seconds if not in the tens of seconds. Together with the process of using forward error correction (FEC) algorithm for feedback or other feedback mechanism to find the right setting for the TDCM, the entire process of recovering optical transportation system 1 from fiber cut, for example, for just one channel may take several seconds and sometimes close to tens of seconds. It is generally known in the industry that for dynamic line protection application it is required that the system recovery time be less than 50 ms. Obviously, thermally-tuned TDCM is unable to meet the 50 ms recovery time requirement for the protection scheme of an optical transportation system.

SUMMARY

Embodiments of present invention provide an optical signal transportation system. In one embodiment, the system includes a first and a second optical line protection (OLP) node; a working signal transmission medium and a protection signal transmission medium between the first and second OLP nodes providing transportation paths for an optical signal from the first OLP node to the second OLP node; and at least one digital dispersion compensation module (DDCM) connected to at least one of the working and protection signal transmission media inside the second OLP node, wherein the DDCM includes a plurality of dispersion compensation units (DCUs) with each DCU being capable of providing either a positive or a negative dispersion selected by an optical switch to the optical signal, and wherein the DDCM is capable of providing the optical signal a total dispersion determined by the optical switch of each of the plurality of DCUs.

According to one embodiment, at least one of the DCUs includes a piece of fiber-bragg grating (FBG) having a first and a second terminal. The DCU is capable of providing the positive dispersion by connecting the optical switch to the first terminal and providing the negative dispersion by connecting the optical switch to the second terminal. In one embodiment, value of the positive dispersion is same as value of the negative dispersion inside the at least one of the DCUs.

In one embodiment, the at least one DDCM is connected to the working signal transmission medium or to the protection signal transmission medium through an optical switch.

In another embodiment, the above at least one DDCM is a first DDCM and is connected to the working signal transmission medium, and the system further includes a second DDCM that is connected to the protection signal transmission medium.

According to one embodiment, the first OLP node includes a test signal generator capable of generating a test optical signal being launched into the working or protection signal transmission medium, the test optical signal includes a plurality of digital optical signals at different wavelengths, the plurality of digital optical signals having a data rate ranging from about 10 Mb/s to about 155 Mb/s.

According to another embodiment, the second OLP node includes a signal processing unit capable of receiving the test optical signal from the first OLP node, dividing the test optical signal into the plurality of digital optical signals according to their respective wavelengths, detecting group delay differences among the plurality of digital optical signals, and determining a total dispersion that the test optical signal experienced from the first OLP node to the second OLP node based on the group delay differences.

In one embodiment, the signal processing unit further includes a plurality optical delay lines capable of adding delays to the plurality of digital optical signals received at the second OLP node.

According to one embodiment, the above optical signal transportation system further includes a second working signal transmission medium and a second protection signal transmission medium between the first and second OLP nodes providing transportation paths for a second optical signal from the second OLP node to the first OLP node. In one embodiment, the first and second signal transmission media are optical fibers.

Embodiments of present invention provide an optical signal transportation system which, in one embodiment, includes a first and a second digital dispersion compensation unit (DDCU); a first and a second working signal transmission medium between the first and second DDCUs providing transportation paths for a first optical signal from the first DDCU to the second DDCU and a second optical signal from the second DDCU to the first DDCU, wherein the first and second DDCUs are capable of providing the first and second optical signals, respectively, with a total amount of dispersion that compensates for proper detection of the first and second optical signals.

BRIEF DESCRIPTION OF THE DRAWINGS

The present invention will be understood and appreciated more fully from the following detailed description of embodiments of the invention, taken in conjunction with accompanying drawings of which.

It will be appreciated that for simplicity and clarity purpose, elements shown in the drawings have not necessarily been drawn to scale. Further, in various functional block diagrams, two connected devices and/or elements may not necessarily be illustrated to be connected, for example, by a continuous solid line or dashed line but rather sometimes a small gap between two lines extended from the two devices and/or elements may be inserted intentionally in order to illustrate the individual devices and/or elements even though their connection is implied. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

Figure 2:
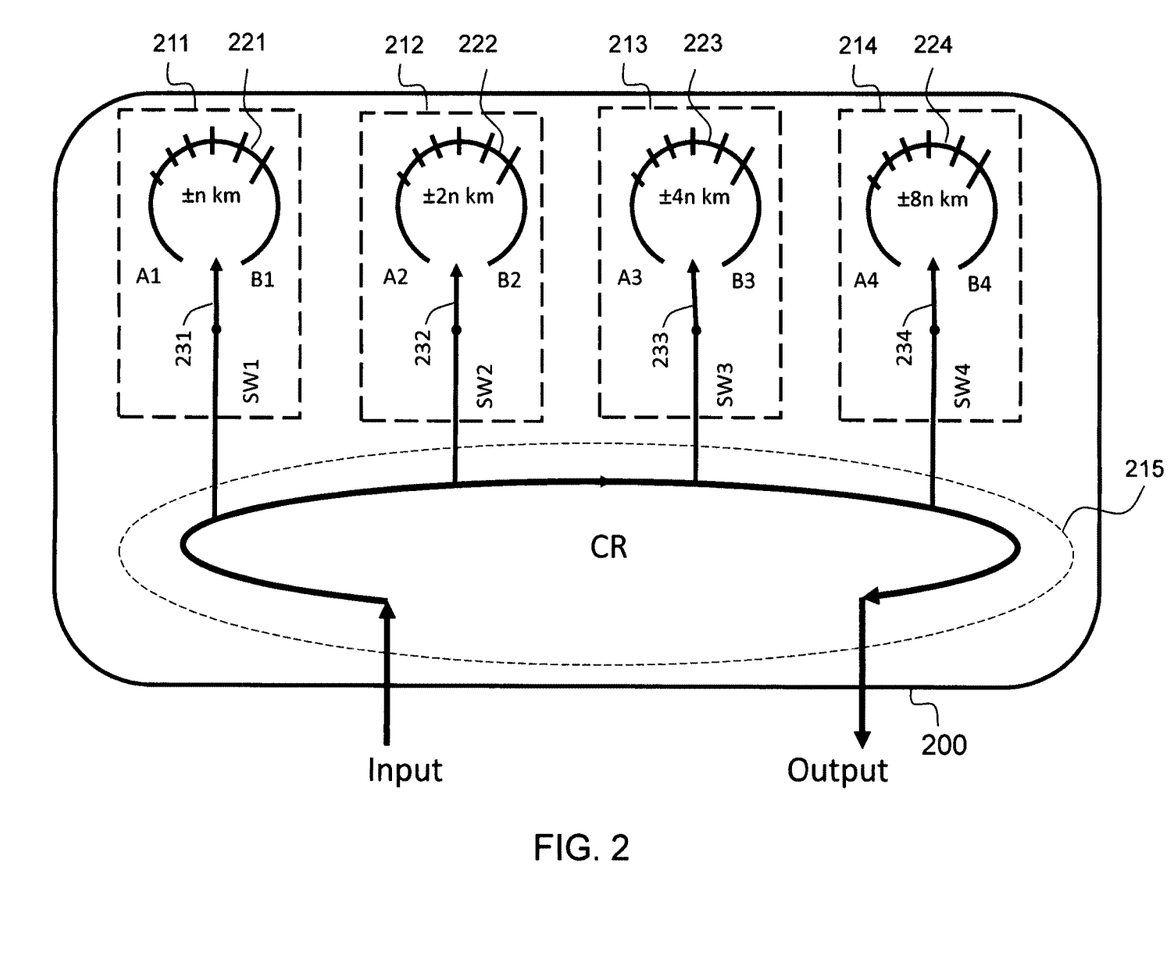
FIG. 2 is a demonstrative illustration of a functional block diagram of an optical digital dispersion compensation module according to one embodiment of present invention.

FIG. 2 is a demonstrative illustration of a functional block diagram of an optical digital dispersion compensation module according to one embodiment of present invention. DDCM 200 may include four dispersion compensation units 211, 212, 213, and 214 that are connected to a multi-port optical circulator 215, such as a 6-port optical circulator, in a cascaded manner. Dispersion compensation unit 211, 212, 213, and 214 may each contain one two-port dispersion element 221, 222, 223, and 224 respectively. The two-port dispersion element has reciprocal dispersion characteristics depending on which port an optical signal enters the dispersion element. For example, an optical signal entering into port Ai (i=1, 2, 3, and 4) and propagating towards port Bi may get reflected back before reaching port Bi and may experience positive dispersion. Alternately, an optical signal entering into port Bi and propagating towards port Ai may get reflected back before reaching port Ai and may experience negative dispersion. In other words, dispersion element 221, 222, 223, and 224 may serve as either a positive dispersion element or a negative dispersion element depending upon which port is used for signal entry.

Dispersion element 221, 222, 223, and 224 may be made, in one embodiment, from non-uniform long fiber-bragg grating (FBG) which has continuous operation bandwidth up to 100 nm. DDCM 200 may thus be able to compensate dispersion over a broad wavelength range anywhere within 1260 nm to 1680 nm to cover multiple optical spectrum bands. By using FBG as dispersion element, DDCM 200 may further be able to compensate dispersion profile such as slope of dispersion, linear or non-linear, or even derivative of slope of dispersion that are considered as high-order dispersion. Compensation of high-order dispersion has been considered as crucial for current and/or future super-channel transmission which generally has up to 400 Gb/s or even terabit transmission capacity.

Dispersion compensation units 211, 212, 213, and 214 may be able to provide a base amount, or a certain integer multiple thereof, of dispersion compensation to an input optical signal. The base amount of dispersion compensation may be determined by the granularity of compensation required by the system where DDCM 200 is used, which is often affected and/or determined by the rate of digital optical signal such as whether the digital optical signal is a 10 Gb/s, 40 Gb/s, or 100 Gb/s optical signal. Furthermore, assuming DCU 211 is designed to have a base amount of dispersion (both positive and negative), equivalent in value to a piece of SMF-28 fiber of n km in length, wherein n may be any suitable number, and having a dispersion amount of y ps/nm/km at a nominal wavelength, DCU 212, 213, and 214 may be designed to have their dispersions equivalent to $2^{i-1} \times n$ km of the same SMF-28 fiber where i=2, 3, and 4.

By setting optical switches 231, 232, 233, and 234 at either port Ai (for positive dispersion) or port Bi (for negative dispersion), where i=1, 2, 3, and 4, the total equivalent dispersion that DDCM 200 may be able to provide may range from −15 n km to +15 n km of SMF-28 fiber with an incremental step of 2 n km. Thus, when being used to compensate a fiber-optic link of a total dispersion equal to a piece of SMF-28 fiber of −16 n km to +16 n km, net dispersion of the fiber-optic link after compensation may be reduced down to within +/−n km. This reduction in net dispersion dramatically eases the required tolerance range of the transmitting and/or receiving devices communicating through the fiber-optic link.

It is to be noted that the above configuration of DDCM 200 may be generalized to include a dispersion compensation module having N dispersion compensation units cascaded by an optical circulator of at least N+2 ports, with N being any suitable digital number such as 4 for DDCM 200 illustrated in FIG. 2. Each dispersion compensation unit k (k=1, 2, . . . N) may be able to selectively provide either a positive or a negative dispersion with a value equivalent to $2^{k-1} \times n$ km SMF-28 fiber. The N dispersion compensation units may be cascaded randomly, in an ascending order, or in a descending order along the optical circulator. The range of dispersion compensation provided by this DDCM may be from $-(2^N-1) \times n$ km to $+(2^N-1) \times n$ km, capable of adjusting a fiber-optic link of with no more than $2^N \times n$ km dispersion down to +/−n km.

DDCM 200 in FIG. 2 uses a set of optical switches 231, 232, 233, and 234 to control and configure a set of dispersion compensation units to provide a combination thereof, thus delivering a right amount of dispersion to a system where it is used. When being compared with conventional dispersion compensation scheme which, for example, uses slow thermally-tuned tunable dispersion compensation module, digital dispersion compensation module controlled by optical switches electronically provides a much fast response time, which is typically determined by the speed of optical switches, of 10 milliseconds (ms) or less.

DDCM 200 demonstratively illustrated in FIG. 2 and other DDCMs such as those that are described in the concurrently filed U.S. patent application "Digital Dispersion Compensation Module", which is incorporated herein by reference in its entirety, may be used in an optical line protection scheme to protect an optical signal transportation system from general transmission path failure such as a sudden fiber cut. The fast response time of 10 milliseconds (ms) or less offered by the DDCM provides the needed speed by the industry standard of 50 ms. Various optical line protection schemes using digital dispersion compensation module are described below in more details with reference to FIGS. 3-5. It is to be noted that in the below description, DDCM used in the system configurations may be the one illustrated in FIG. 2, may be those described in the concurrently filed U.S. patent application "Digital Dispersion Compensation Module", or any other types of dispersion compensation modules that offer a fast response time.

Figure 3:
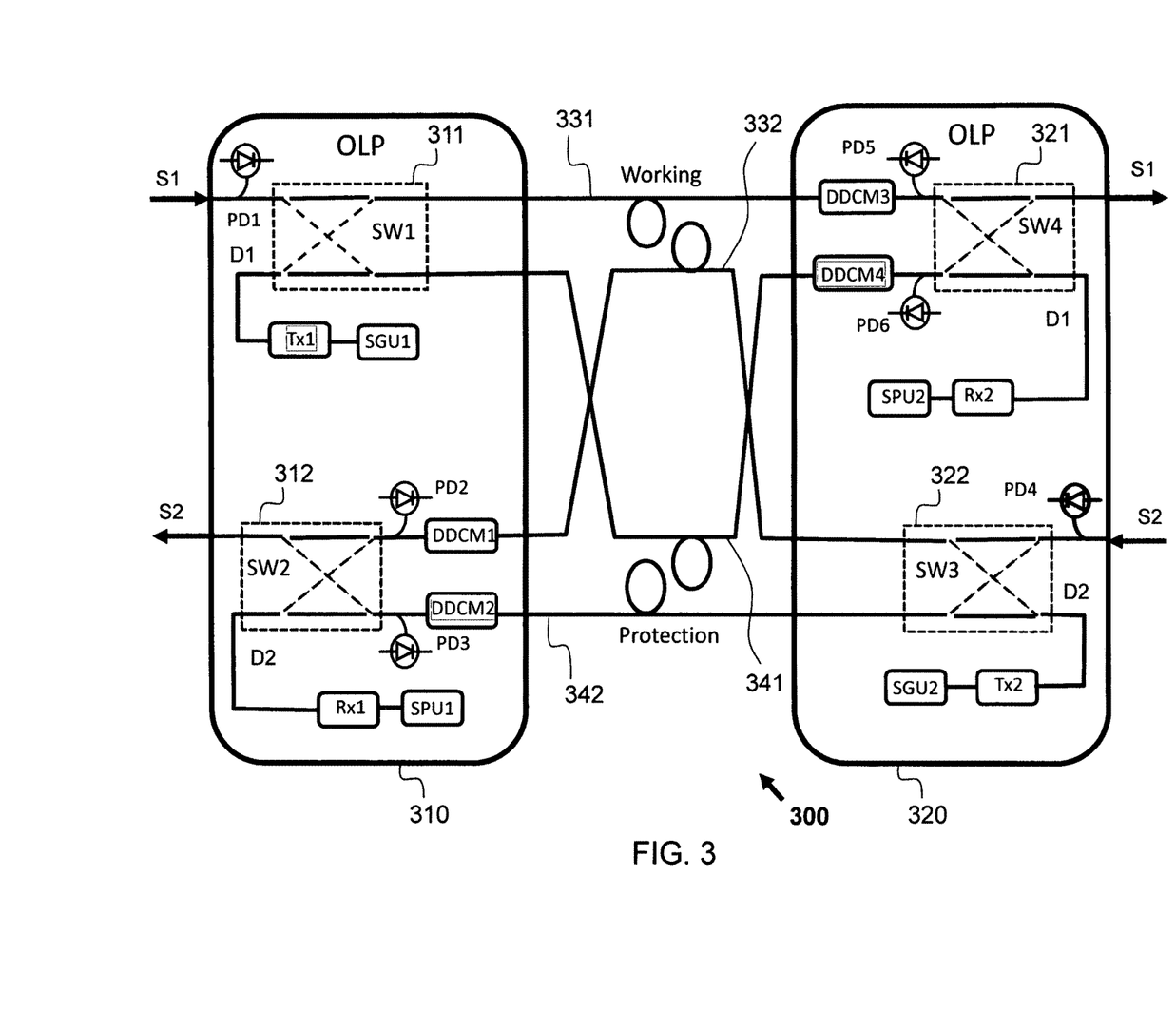
FIG. 3 is a demonstrative functional block diagram illustration of an optical signal transportation system with optical line protection employing digital dispersion compensation module according to one embodiment of present invention.

FIG. 3 is a demonstrative functional block diagram illustration of an optical signal transportation system employing optical line protection using digital dispersion compensation module according to one embodiment of present invention. More specifically, as a non-limiting example, in FIG. 3 optical signal transportation system 300 is demonstratively illustrated to have a first optical line protection (OLP) node 310, a second OLP node 320, and at least a first working signal transmission medium 331 and a first protection signal transmission medium 341 between first and second OLP nodes 310 and 320. Signal transmission media 331 and 341 provide transportation paths for optical signals, for example optical signal S1, to be transported or to transmit or propagate from first OLP node 310 to second OLP node 320.

In one embodiment, system 300 may be a bi-directional optical signal transportation system and, in addition to first working signal transmission medium 331 and first protection signal transmission medium 341, have a second working signal transmission medium 332 and a second protection signal transmission medium 342 providing transportation paths for optical signals, for example optical signal S2, to be transported or to transmit or propagate from second OLP 320 to first OLP node 310. In FIG. 3, system 300 is demonstratively illustrated as a point-to-point signal transportation system. However, embodiments of present invention are not limited in this respect and may be applied to other types of systems such as, for example, a ring system or a mesh system wherein working and protection signal transmission media may take different geographic routes.

In system 300, signal transmission media 331, 341, 332, and 342 may be optical fibers including conventional single mode fiber such as SMF-28, dispersion shifted fiber (DSF), or any other currently existing or future developed fibers. However, other types of signal transmission medium such as free space, bulk optics, or any combination of the above transmission media may be used as well, all of which are fully contemplated herein by applicants. Nevertheless, in the following description, for simplicity without losing generality, signal transmission media 331, 341, 332, and 342 may be referred to as optical fibers or, simply as fibers.

Generally when disruption such as fiber cut happens to a working fiber 331, or a pair of working fibers 331 and 332 in a bi-directional system, optical signals are routed to a protection fiber 341 or a pair of protection fibers 341/342. However, the protection fiber or fibers in general have different amount of total dispersion from that of the working fiber or fibers and the difference in the amount of dispersion needs to be properly compensated before data communication may be restored properly or re-established.

According to one embodiment of present invention, OLP nodes 310 and 320 may be able to protect continuity of optical signal transportation in the event of fiber cut or other disruption to transmission media 331 and/or 332, and the protection may be achieved within 50 milliseconds (ms) or less, possibly within 10 ms. The above fast data restoration is achieved by embodiment of present invention through the application of a digital dispersion compensation module (DDCM) that has a set of dispersion compensation modules with pre-determined dispersion values. Inside the DDCM, the set of dispersion compensation modules may be quickly and electronically configured through a set of optical switches to provide a combination thereof with desired total dispersion value to the protection fiber 341 and/or 342. One of such DDCMs is described above in detail with reference to FIG. 2, and more examples may be referenced to the concurrently filed U.S. patent application "Digital Dispersion Compensation Module".

Embodiments of present invention provide optical line protection through the use of one or more OLP nodes such as OLP node 310 and OLP node 320. Each OLP node provides protective function for both transmitting and receiving of optical signals. More specifically, for example, at the transmitting side, OLP node 310 may include a two-by-two (2×2) optical switch 311 (SW1) that, during normal operation, receives an optical signal S1 and transmits the optical signal S1 to working fiber 331. Optical switch 311 may also receive a testing signal D1, either during normal operation or in the event of transmission media disruption such as fiber cut, and may transmit the test signal D1 to protection fiber 341 for total dispersion set up or optical signal restoration during disruption. Embodiments of present invention may also include sending test signal D1 to working fiber 331 for the initial set up of working fiber total dispersion. Test signal D1 may be generated by a transmitter Tx1 through a signal generating unit SGU1, the function of which is described below in more details with reference to FIG. 6.

On the receiving side, OLP node 310 may include a two-by-two (2×2) optical switch 312 (SW2) that, during normal operation, receives an optical signal S2 from working fiber 332 and passes it through for normal transmission. OLP node 310 may also receive a test signal D2, either during normal operation or in the event of transmission media disruption such as fiber cut, to be processed by a receiver Rx1 and a signal processing unit SPU1 for set up of total dispersion of working fiber 332 or protection fiber 342 or for optical signal restoration through protection fiber 342 during disruption. OLP node 310 may include a first digital dispersion compensation module DDCM 1 in working fiber 332 and a second digital dispersion compensation module DDCM 2 in protection fiber 342. Test signal D2 may enter DDCM 1 or DDCM 2, and pass through optical switch 312 (SW2) to be received and processed by Rx1 and SPU1, function of which are described below in more details with reference to FIG. 6.

More specifically, during normal working operation, DDCM 1 of OLP node 310 may provide a properly determined dispersion to working fiber 332, through proper setting of optical switches therein automatically or manually, for example during an initial set up process of working fiber 332. Optical switch 312 may be in a pass-through position such that optical signal S2 from OLP node 320 passes through optical switch 312 and exit OLP node 310. In the meantime, OLP node 320 may send test signal D2 to propagate through protection fiber 342, through DDCM 2, to be received by Rx1 and processed by SPU1. The amount of dispersion of protection fiber 342 may thus be determined by SPU1 which subsequently sets, automatically or manually, a proper total dispersion of DDCM 2 by electronically controlling a set of optical switches inside thereof such that protection fiber 342 is pre-conditioned to be ready for optical signal transportation from OLP node 320 to OLP node 310 in the event of a fiber cut. For example, the total dispersion of DDCM 2 may be decided based on optical signal S2 being properly detected. The set up of protection fiber 342 may be performed during normal operation when working fiber 332 is working properly, or be performed on-demand when a fiber cut, for example, is detected and restoration of optical signal transportation is requested. Embodiments of present invention are able to achieve signal restoration within 50 ms or less even on-demand because of the use of digital dispersion compensation modules that are controlled by a set of optical switches.

OLP node 310 may additionally include photo-detectors PD1, PD2, and PD3 monitoring optical signal power level at various points in association with the operation of optical switches 311 and 312, and/or monitoring and triggering of various system operation alarms.

In FIG. 3, system 300 is a bi-directional optical signal transportation system, and OLP node 320 operates similarly as OLP node 310. For example, OLP node 320 may include an optical switch 322 (SW3) on a transmitting side to send optical signal S2 and/or test signal D2 generated by transmitter Tx2 and signal generating unit SGU2. On a receiving side, OLP node 320 may include two digital dispersion compensation modules DDCM 3 and DDCM 4 cascaded to working fiber 331 and protection fiber 341, respectively. OLP node 320 may include an optical switch 321 (SW4) to receive optical signal S1 and/or test signal D1 and test signal D1 may be received by a receiver Rx2 and processed by a signal processing unit SPU2 for the set up of DDCM 3 and/or DDCM 4, automatically or manually. OLP node 320 may include photo-detectors PD4, PD5, and PD6.

Figure 4:
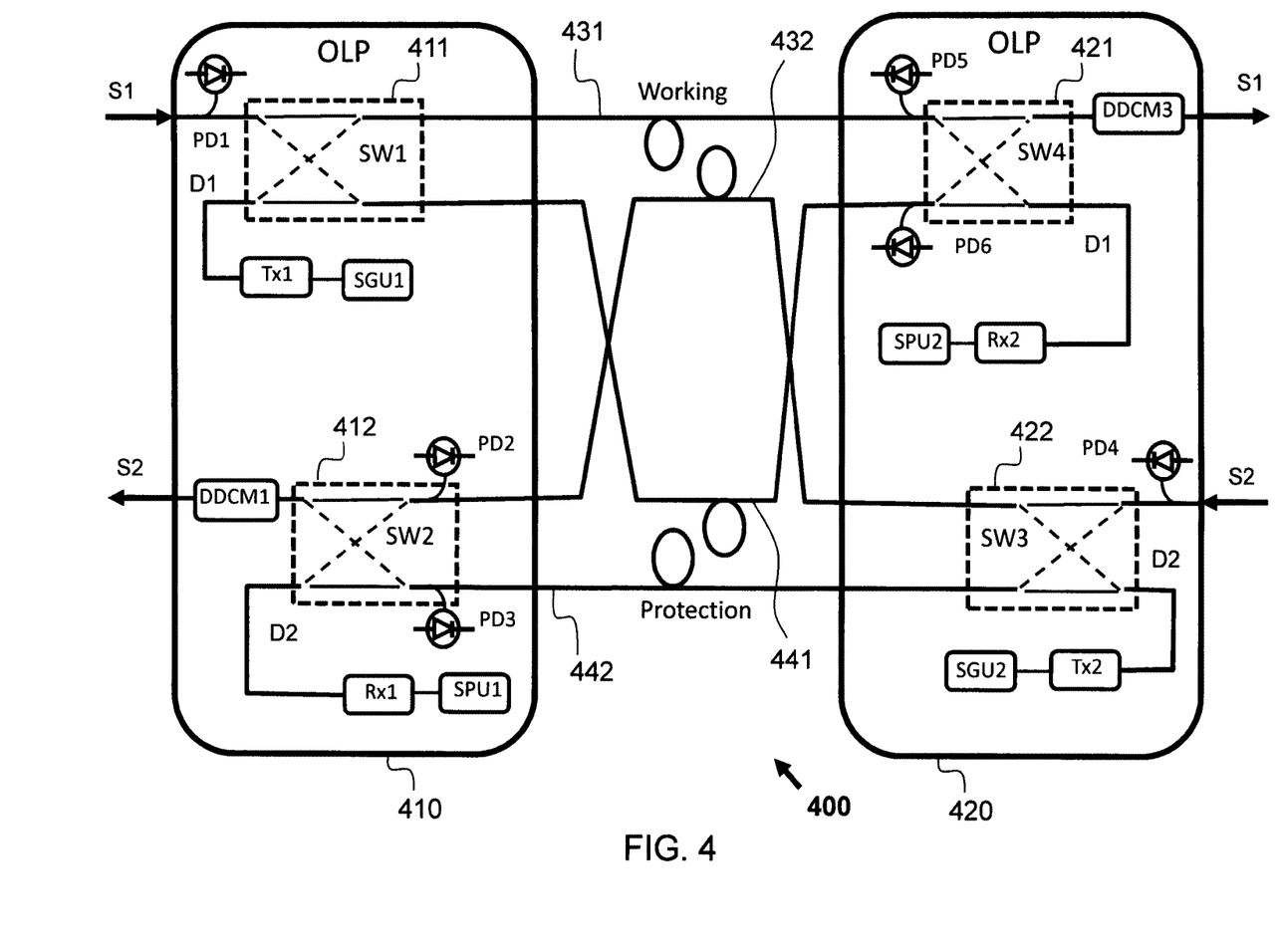
FIG. 4 is a demonstrative functional block diagram illustration of an optical signal transportation system with optical line protection employing digital dispersion compensation module according to another embodiment of present invention.

FIG. 4 is a demonstrative functional block diagram illustration of an optical signal transportation system with optical line protection employing digital dispersion compensation module according to another embodiment of present invention. In FIG. 4, optical signal transportation system 400 includes a first OLP node 410 and a second OLP node 420. Comparing with OLP node 310 in system 300 being illustrated in FIG. 3, OLP node 410 includes only DDCM 1 that is placed after a 2×2 optical switch 412 (SW2) and shared by working fiber 432 and protection fiber 442. Therefore, during normal operation, DDCM 1 may be properly set up for dispersion compensation of working fiber 432 only, and thus may not be set up for dispersion compensation of protection fiber 442. Protection fiber 442 may only be set up for dispersion compensation by DDCM 1 during signal restoration in the event of fiber cut in the working fiber 432.

On the transmitting side, OLP node 410 works similarly as OLP node 310. For example, OLP node 410 may includes a 2×2 optical switch 411 (SW1) and may transmit an optical signal S1 and/or a test signal D1 to working fiber 431 and/or protection fiber 441, and may include transmitter Tx1 and signal generating unit SGU1 for generating test signal D1. OLP node 410 may also include photo-detectors PD1, PD2, and PD3 for various optical signal detection and alarm processing.

As a bi-directional optical signal transportation system, OLP node 420 may operate similarly to OLP node 410. For example, OLP node 420 may include an optical switch 422 (SW3) on a transmitting side to send optical signal S2 and/or test signal D2 generated by transmitter Tx2 and signal generating unit SGU2. On a receiving side, OLP node 420 may include only DDCM 3 that is placed after a 2×2 optical switch 421 (SW4) and shared by working fiber 431 and protection fiber 441. OLP node 420 may receive optical signal S1 and/or test signal D1 and test signal D1 may be received by receiver Rx2 and processed by signal processing unit SPU2 for set up of DDCM 3 such as setting of the optical switches therein automatically or manually. OLP node 420 may include photo-detectors PD4, PD5, and PD6.

Figure 5:
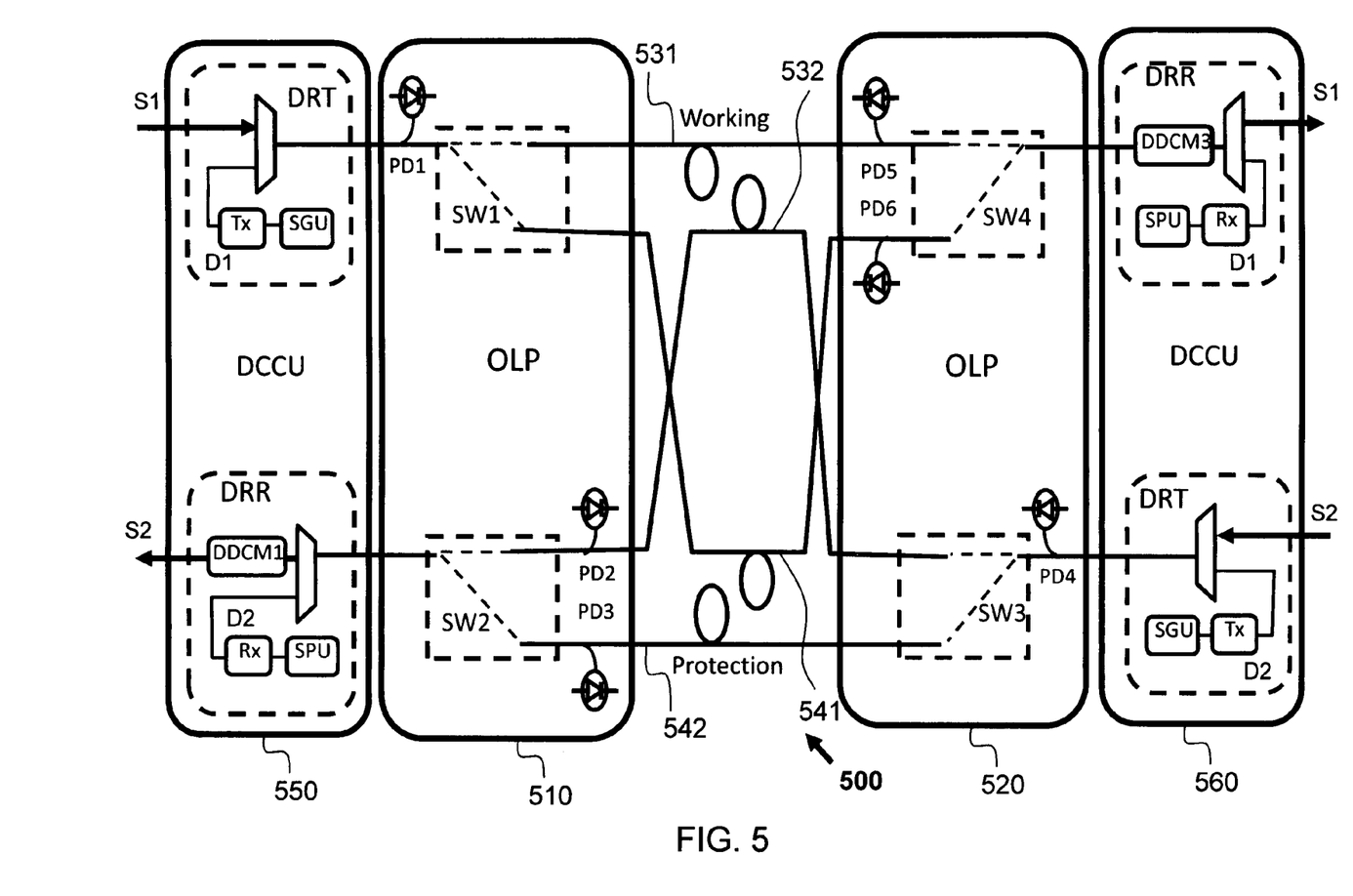
FIG. 5 is a demonstrative functional block diagram illustration of an optical signal transportation system with optical line protection employing digital dispersion compensation module according to a further embodiment of present invention.

FIG. 5 is a demonstrative functional block diagram illustration of an optical signal transportation system with optical line protection employing digital dispersion compensation module according to a further embodiment of present invention. In FIG. 5, optical signal transportation system 500 may include a first OLP node 510 and a second OLP node 520 that are respectively connected to a first digital dispersion compensation unit (DDCU) 550 and a second DDCU 560. Different from embodiments illustrated above in FIG. 3 and FIG. 4, OLP node 510 includes, in addition to photo-detectors PD1, PD2 and PD3, only an input one-by-two (1×2) optical switch (SW1) that selects an optical signal from DDCU 550 to transport either through a working fiber 531 or a protection fiber 541, and an output 1×2 optical switch (SW2) that selects an optical signal from either working fiber 532 or protection fiber 542 to output to DDCU 550 for processing. Similarly, OLP node 520 includes, in addition to photo-detectors PD4, PD5, and PD6, only an input one-by-two (1×2) optical switch (SW3) that selects to transport an optical signal from DDCU 560 either through a working fiber 532 or a protection fiber 542, and an output 1×2 optical switch (SW4) that selects an optical signal from either working fiber 531 or protection fiber 541 to output to DDCU 560 for processing.

System 500 of FIG. 5 also includes DDCU 550 and DDCU 560 connected to OLP 510 and OLP 520 respectively. DDCU 550, on a transmitting side, includes a multiplexer that combines an optical signal S1 with a test signal D1, generated by transmitter Tx and signal generating unit SGU, and transmits the combined signal to OLP 510. On a receiving side, DDCU 550 receives a combined signal of an optical signal S2 and a test signal D2 from OLP 510 and a demultiplexing divider subsequently directs the optical signal S2 through a digital dispersion compensation module DDCM 1 and the test signal D2 to a receiver Rx and signal processing unit SPU, which detects the amount of dispersion of working fiber 532 or protection fiber 542 and adjusts automatically a total dispersion amount of DDCM 1 for proper compensation. DDCU 560 functions similarly as DDCU 550 to include a transmitting side with a multiplexer, a Tx, and a SGU and a receiving side with a demultiplexing divider, a DDCM 3, a Rx, and a SPU. It is to be noted that the digital dispersion compensation module, such as DDCM 3, may be optionally placed before the demultiplexing divider. The amount of additional dispersion DDCM 3 experienced by test signal D1 may be taken into account during dispersion set up by SPU.

It is to be noted here that there may be various variations of configuration of the optical transportation system 500 illustrated in FIG. 5 that are fully within the spirit of present invention. In one embodiment, some optical signal transportation system may operate without optical line protection (OLP). For example, a system may be similar to system 500 in FIG. 5; may not include OPL 510 and OPL 520 and protection fibers 541 and 542; and may include only working fibers 531 and 532 that are directly connected to DDCUs 550 and 560. During system setup, DRT modules inside one DDCU unit may work with DRR modules in the other DDCU unit to determine the amount of dispersion of the working fibers 531 and 532, and automatically decide the amount of dispersion compensation to be provided by DDCM 1 and DDCM 3 for the respective fibers 531 and 532. Such a system may include, for example, an un-protected 100 Gb/s non-return-to-zero (NRZ) optical signal transportation system.

Figure 6:
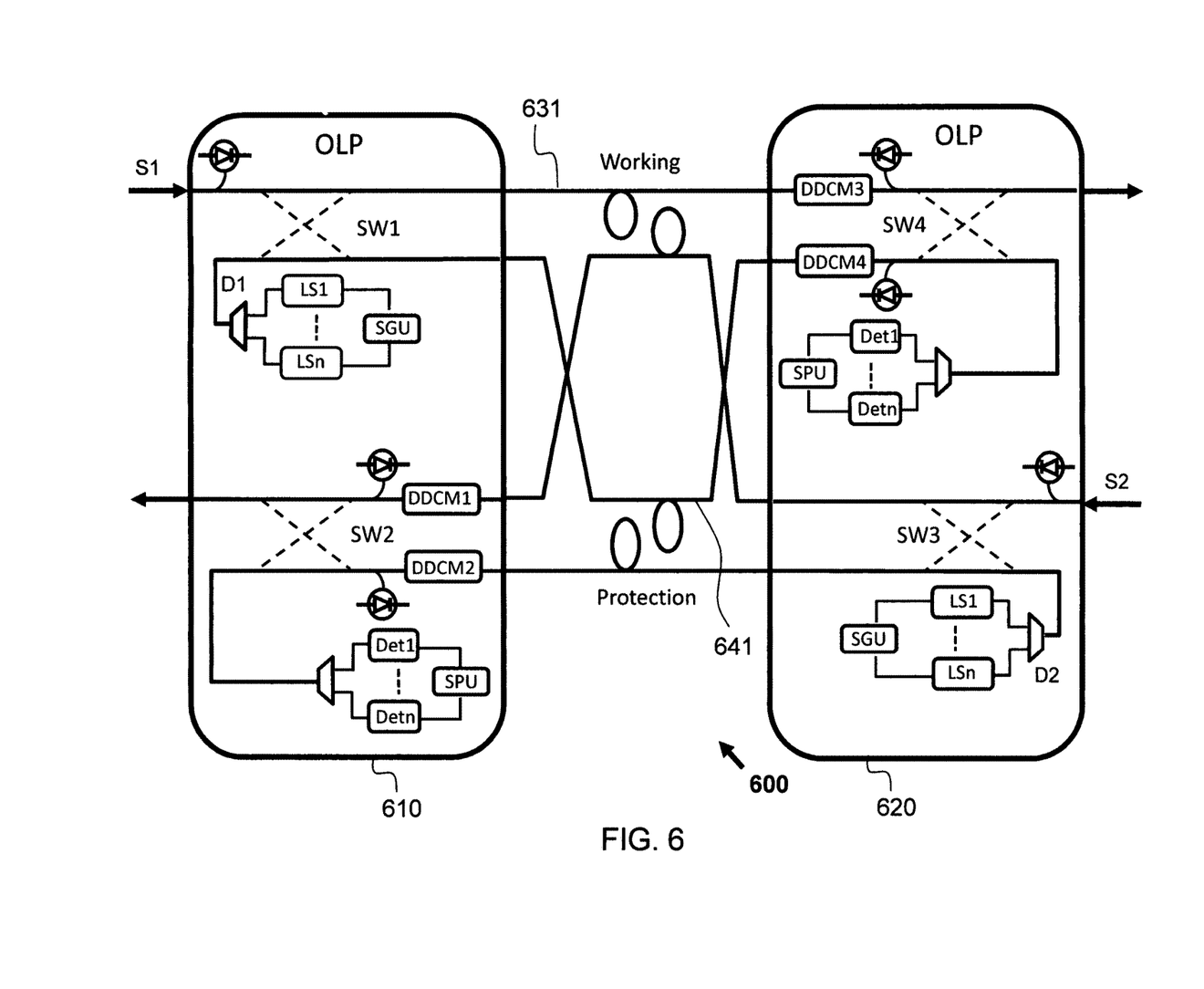
FIG. 6 is a demonstrative illustration of a system diagram for dispersion measurement of an optical link according to one embodiment of present invention.

FIG. 6 is a demonstrative illustration of a system diagram for dispersion measurement of an optical link according to one embodiment of present invention. According to one embodiment of present invention, multiple optical sources may be combined and used to detect the amount of dispersion of an optical transmission link or medium, and thus any dispersion differences among different transmission media. It is known in the art that optical signal experiences a group delay during transportation that differs for different wavelengths, and the difference may be expressed as $D \times \Delta\lambda$ with D being dispersion of the transmission medium and $\Delta\lambda$ being difference in wavelength of the optical signals. Thus, by measuring the group delay difference among a set of optical signals with known difference in their wavelengths, total dispersion D of a transmission medium may be determined. Dispersions in different transmission media and their difference may be determined as well.

More specifically, the transmitter and signal generating unit (Tx1 and SGU1, Tx2 and SGU2, or Tx and SGU in FIGS. 3, 4, and 5) may be implemented as is illustrated in OLP 610 of FIG. 6, according to one embodiment of present invention. OLP 610 may include multiple light sources, such as laser sources or laser signals, of LS1 . . . LSn that are modulated or controlled by a signal generating unit SGU. Alternatively, the multiple light sources may be implemented by applying multiple synchronized frequency sources to modulate a single laser source. Lights from the multiple light sources may be combined by a wavelength division multiplexer (WDM) combiner to become a test signal D1 which is then launched into transmission media or fibers 631 and/or 641, via optical switch SW1, for the measurement of dispersion.

After propagating through transmission media of working fiber 631 or protection fiber 641, test signal D1 is received by OLP node 620. Test signal D1 is then divided into individual light signals LS1 . . . LSn, according to their respective wavelengths, by a WDM divider and subsequently be detected by their respective photo-detectors Det1 . . . Detn. Delays among different wavelength signals may be detected and actual dispersion of the transmission medium may be determined.

Figure 7:
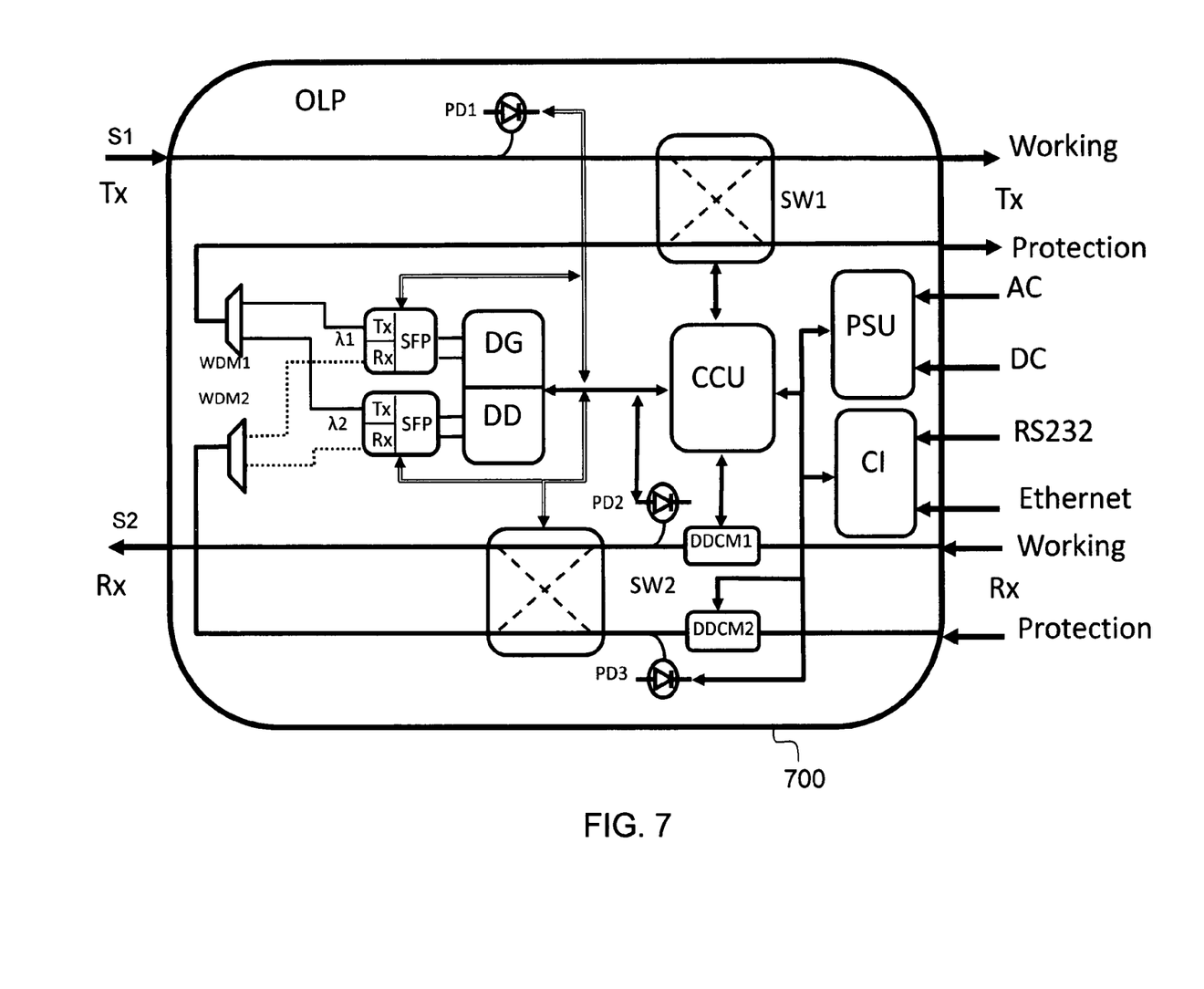
FIG. 7 is a demonstrative illustration of a block diagram of a system node for dispersion measurement according to one embodiment of present invention.

FIG. 7 is a demonstrative block diagram illustration of an optical line protection node for dispersion measurement according to one embodiment of present invention. In FIG. 7, OLP node 700 includes various components such as power supply unit (PSU), digital dispersion compensation module DDCM 1 and DDCM 2 for the working and protection fibers, optical switch SW1 at the transmitting side (Tx), optical switch SW2 at the receiving side (Rx), and a plurality of photo detectors PD1, PD2, and PD3. In addition, according to one embodiment, OLP node 700 may include a delay signal generator (DG), which generates dispersion test signals at for example two different wavelengths $\lambda 1$ and $\lambda 2$ which are then combined by WDM1 and transmit to either the working fiber or the protection fiber selected by optical switch SW1. OLP node 700 may also include a delay signal detector (DD), which measures a delay between two individual signals of different wavelengths $\lambda 1$ and $\lambda 2$ that are received via optical switch SW2 and separated by WDM2, and determine the dispersion value of transmission medium. In FIG. 7, CCU denotes a central control unit that controls the two digital dispersion compensation modules and the two optical switches. CI is a communication interface while PSU provides electric power for circuit operation.

Figure 8:
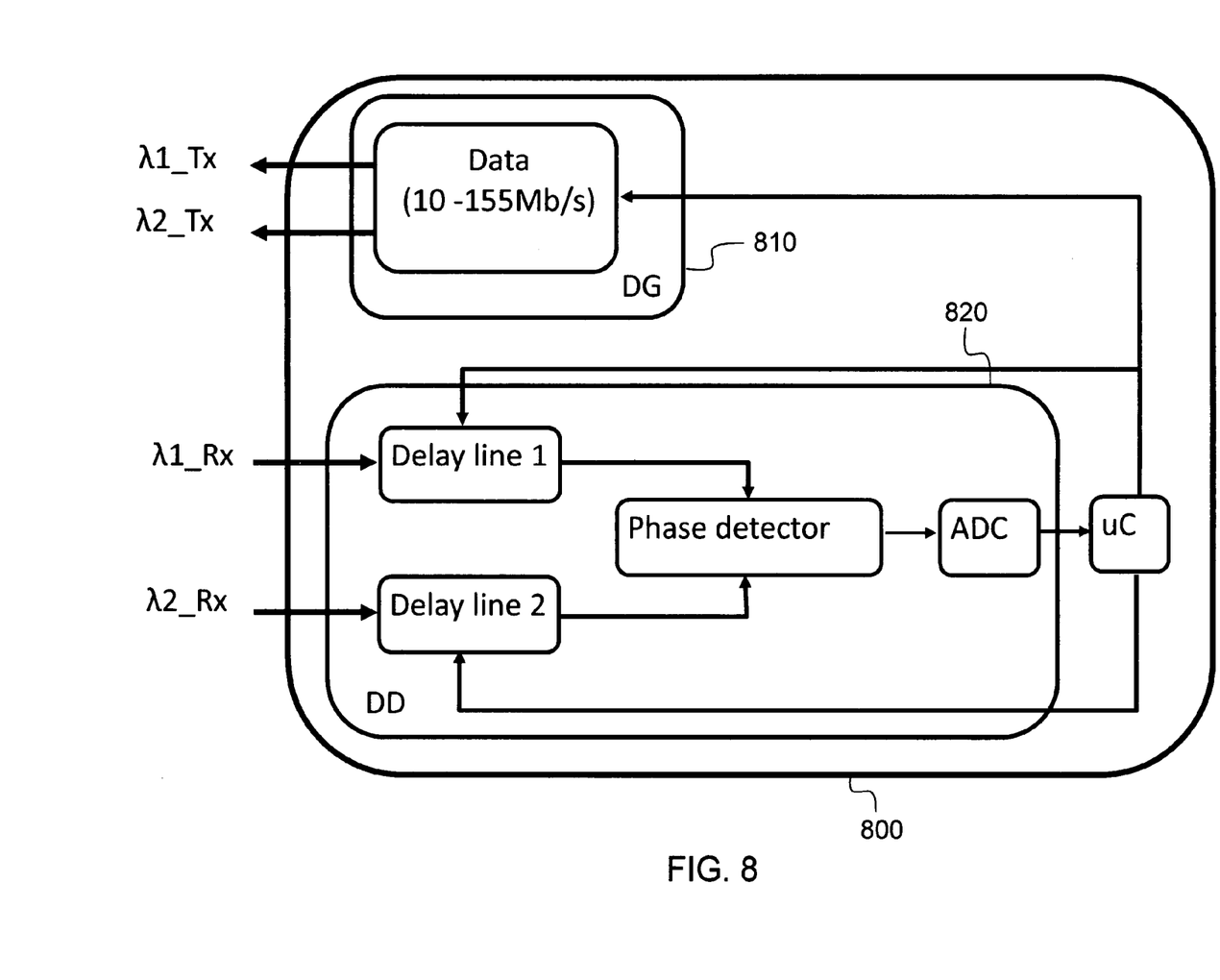
FIG. 8 is a demonstrative illustration of a block diagram of a digital signal generation and receiving according to one embodiment of present invention.

FIG. 8 is a demonstrative block diagram illustration of implementation of delay signal generator and delay signal detector according to one embodiment of present invention. Delay signal generator DG may generate digital test signals with pre-determined relative delay in a data rate between about 10 Mb/s and about 155 Mb/s which may be used to modulate multiple, such as two, laser signals of different wavelengths. Delay signal detector DD may include two delay lines such as fixed optical delay lines or adjustable electrical delay lines. The delay lines may be used to enhance dispersion measurement capability. Delay signal detector DD may also include a phase detector that detects a phase difference between the two test signals received via the two delay lines. ADC is an analog-to-digital convertor that converts the detected phase difference from analog format to digital format, which is subsequently sent to a microprocessor uC to determine the dispersion value.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An optical signal transportation system comprising:
a first and a second optical line protection (OLP) node;
a working signal transmission medium and a protection signal transmission medium between said first and second OLP nodes providing transportation paths for an optical signal from said first OLP node to said second OLP node; and
at least one digital dispersion compensation module (DDCM) connected to at least one of said working and protection signal transmission media inside said second OLP node,
wherein said DDCM comprises a plurality of dispersion compensation units (DCUs) with each DCU being capable of providing either a positive or a negative dispersion selected by an optical switch to said optical signal, and wherein said DDCM is capable of providing said optical signal a total dispersion determined by said optical switch of each of said plurality of DCUs,
wherein at least one of said DCUs comprises a piece of fiber-bragg grating (FBG) having a first and a second terminal, and is capable of providing said positive dispersion by connecting said optical switch to said first terminal and providing said negative dispersion by connecting said optical switch to said second terminal, and
wherein said first and second OPL nodes are directly connected by said working signal transmission medium as well as directly connected by said protection signal transmission medium, and wherein said first OLP node comprises a test signal generator capable of generating a test optical signal being launched into said working or protection signal transmission medium, said test optical signal comprises a plurality of digital optical signals at different wavelengths, said plurality of digital optical signals having a data rate ranging from about 10 Mb/s to about 155 Mb/s.

2. The optical signal transportation system of claim 1, wherein value of said positive dispersion is same as value of said negative dispersion inside said at least one of said DCUs.

3. The optical signal transportation system of claim 1, wherein said at least one DDCM is connected to said working signal transmission medium or to said protection signal transmission medium through an optical switch.

4. The optical signal transportation system of claim 1, wherein said at least one DDCM is a first DDCM, further comprising a second DDCM and said first and second DDCMs are respectively connected to said working and protection signal transmission media.

5. The optical signal transportation system of claim 1, wherein said second OLP node comprises a signal processing unit capable of receiving said test optical signal from said first OLP node, dividing said test optical signal into said plurality of digital optical signals according to their respective wavelengths, detecting group delay differences among said plurality of digital optical signals, and determining a total dispersion that said test optical signal experienced from said first OLP node to said second OLP node based on said group delay differences.

6. The optical signal transportation system of claim 5, wherein said signal processing unit further comprises a plurality optical delay lines capable of adding delays to said plurality of digital optical signals received at said second OLP node.

7. The optical signal transportation system of claim 1, further comprising a second working signal transmission medium and a second protection signal transmission medium between said first and second OLP nodes providing transportation paths for a second optical signal from said second OLP node to said first OLP node.

8. The optical signal transportation system of claim 1, wherein said first and second signal transmission media are optical fibers.

9. An optical signal transportation system comprising:
a digital dispersion compensation unit (DDCU); and
a working signal transmission medium connected to said DDCU providing a transportation path for an optical signal into said DDCU,
wherein said DDCU comprises one digital dispersion compensation module (DDCM), said DDCM comprises a plurality of dispersion compensation units (DCUs) with each DCU being capable of providing either a positive or a negative dispersion selected by an optical switch to said optical signal, and wherein at least one of said DCUs comprises a piece of fiber-bragg grating (FBG) having a first and a second terminal, and is capable of providing said positive dispersion by connecting said optical switch to said first terminal and providing said negative dispersion by connecting said optical switch to said second terminal, and
wherein said DDCU is a first DDCU, said working signal transmission medium is a first working signal transmission medium, and said optical signal is a first optical signal, further comprising:
a second digital dispersion compensation unit (DDCU);
a second working signal transmission medium;
a first and a second protection signal transmission medium residing between said first and second DDCUs; and
a first and a second optical line protection (OLP) node connecting directly to said first and second working signal transmission media and directly to said first and second protection signal transmission media,
wherein said first and second OLP nodes connect said first and second working signal transmission media as well as said first and second protection signal transmission media, respectively, to said first and second DDCUs through one or more optical switches therein, and wherein said first and second working signal transmission media residing between said first DDCU and said second DDCU, said second working signal transmission medium providing a transportation path for a second optical signal from said first DDCU to said second DDCU, and said first and second DDCUs are capable of providing said first and second optical signals, respectively and automatically, with a total amount of dispersion that ensures proper detection of said first and second optical signals.

10. The optical signal transportation system of claim 9, wherein said first DDCU comprises said DDCM and a demultiplexing divider, said demultiplexing divider providing a test optical signal from said second DDCU to be processed by a signal processing unit (SPU), said SPU being capable of controlling said total amount of dispersion of said DDCM based upon said test optical signal.

11. The optical signal transportation system of claim 10, wherein said SPU further comprises a plurality optical delay lines capable of adding delays to said test optical signal.

12. The optical signal transportation system of claim 9, wherein said first and second DDCUs further comprises, respectively, a test signal generator capable of generating a test optical signal being launched into said second and first working signal transmission medium respectively, said test optical signal comprises a plurality of digital optical signals at different wavelengths, said plurality of digital optical signals having a data rate ranging from about 10 Mb/s to about 155 Mb/s and being used in determining a total dispersion experienced by said test optical signal based on group delay differences among said plurality of digital optical signals caused by said first or second working signal transmission media.

13. An optical signal transportation system comprising:
a first and a second digital dispersion compensation unit (DDCU);
a first and a second working signal transmission medium between said first and second DDCUs providing transportation paths for a first optical signal from said first DDCU to said second DDCU and a second optical signal from said second DDCU to said first DDCU;
a first and a second protection signal transmission medium residing between said first and second DDCUs; and
a first and a second optical line protection (OLP) node that are connected directly to said first and second working signal transmission media and directly to said first and second protection signal transmission media,
wherein said first and second OLP nodes connect said first and second working signal transmission media as well as said first and second protection signal transmission media, respectively, to said first and second DDCUs through one or more optical switches therein, and,
wherein said first and second DDCUs are capable of providing said first and second optical signals, respectively, with a total amount of dispersion that compensates for proper detection of said first and second optical signals, and each DDCU includes at least one dispersion compensation unit (DCU) comprising a piece of fiber-bragg grating (FBG) having a first and a second terminal, the DCU is capable of providing a positive dispersion to said first or second optical signal entering said first terminal and providing a negative dispersion to said first or second optical signal entering said second terminal.

14. The optical signal transportation system of claim 13, wherein at least said first DDCU comprises a digital dispersion compensation module (DDCM); a demultiplexing divider; and a signal processing unit (SPU), and wherein said demultiplexing divider providing a test optical signal from said second DDCU; said test optical signal being processed by said SPU; and said SPU controlling said total amount of dispersion of said DDCM based on said test optical signal.

15. The optical signal transportation system of claim 14, wherein said SPU further comprises a plurality optical delay lines capable of adding delays to said test optical signal.

* * * * *